United States Patent Office 3,340,262 Patented Sept. 5, 1967

3,340,262

PROCESS FOR THE PREPARATION OF O,O-DIALKYL-O-2-PYRAZINYL PHOSPHOROTHIOATES

George Nicholas Gagliardi, Trenton, N.J., assignor to American Cyanamid Company, Stamford, Conn., a corporation of Maine No Drawing. Filed Mar. 10, 1965, Ser. No. 438,724
4 Claims. (Cl. 260—250)

This invention relates to an improved process for preparing 2-pyrazinyl phosphorothioates of the general formula

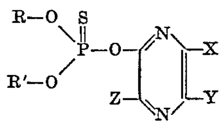

wherein R and R′ are lower alkyl, as for example methyl, ethyl, propyl, isopropyl and butyl, and X, Y and Z are selected from the group consisting of hydrogen, halogen, phenyl and lower alkyl.

Compounds of the above formula and methods for their preparation are described in U.S.P. 2,918,468 and U.S.P. 3,091,614. The processes described in each of these references basically entail the reaction of a dialkyl phosphorochloridothioate of the formula

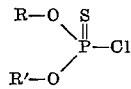

with an alkali metal salt of a hydroxypyrazine of the formula

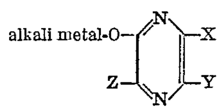

In a typical procedure of the process described in U.S.P. 2,918,468, O,O-diethyl-O-(2-pyrazinyl)phosphorothioate is prepared by slurrying the sodium salt of 2-hydroxypyrazine in N-methyl-2-pyrrolidone with O,O-diethyl phosphorochloridothioate at a temperature of about 50° C. The reaction is continued for about 3 hours and the reaction mixture is then filtered. The filtrate is then dissolved in a suitable solvent such as toluene, washed with sodium carbonate, and then washed with saturated sodium chloride solution to neutrality.

Thereafter, the toluene solution is dried, as for example, over anhydrous magnesium sulfate, concentrated in vacuo, filtered, and the resulting product recovered.

The process of U.S.P. 3,091,614 represents an improvement in the process of U.S.P. 2,918,468 in that significantly increased yields of substantially pure product are obtained when cuprous chloride is employed as a catalyst in the process described above and set forth in greater detail in the earlier patent.

While both of the above-described processes are effective, they are not entirely satisfactory and new and improved processes are continually being sought.

More particularly, these processes of the prior art are complicated by the use of organic solvents as the reaction medium, which use normally necessitates several filtration, washing and solvent-stripping steps in order to recover the desired end product.

Accordingly, it is an object of this invention to provide an improved process which eliminates the time-consuming and costly practices of the prior art processes as they are referred to above, such as filtrations, solvent stripping, and solvent recovery, which improved process, in addition to overcoming the disadvantages of the prior art processes, actually results in the production of a product of improved quality and in addition permits the economical recovery of a costly starting material, namely the alkali metal salts of 2-hydroxypyrazine referred to hereinabove, which salts, it should be noted, do not have to be dried free of water prior to use.

These and other objects and advantages of this invention will become more apparent from the detailed description thereof set forth hereinbelow.

In accordance with this invention, a process is provided for preparing phosphorothioates of the formula

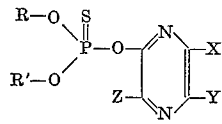

where R and R′ are lower alkyl, X, Y and Z are selected from the group consisting of hydrogen, halogen, phenyl and lower alkyl, which process comprises reacting a dialkyl phosphorochloridothioate of the formula

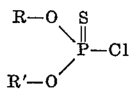

with an alkali metal salt of a hydroxypyrazine of the formula

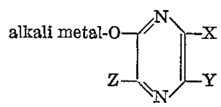

where R, R′, X, Y and Z have the values specified above, by continuously adding said dialkyl phosphorochloridothioate to an aqueous solution of said alkali metal salt while maintaining the pH of the reaction mixture at a value of between about 8.5 and 10.

The two critical features of this process are (1) the continuous addition of the phosphorochloridothioate to the alkali metal salt of hydroxypyrazine throughout at least part of the reaction period while (2) maintaining the pH of the reaction medium at a value of between 8.5 and 10 and preferably from between 9 and 9.5.

Thus, it has been determined that if the entire amount of phosphorochloridothioate to be reacted is added all at once to the aqueous alkali metal hydroxypyrazine solution, that both the percent yield and the quality of the final product suffer. In addition, it has been determined that when the pH of the reaction mixture falls below 8.5 or rises above pH 10 that both the percent yield and quality of product suffer.

To achieve pH control, an alkali metal base such as sodium hydroxide, potassium hydroxide, sodium carbonate or potassium carbonate or their equivalents may be added to the aqueous solution of the alkali metal salt of 2-hydroxypyrazine simultaneously with the addition of the O,O-dialkyl phosphorochloridothioate. It seems that maximum beneficial effect is achieved when the alkali metal base and the phosphorochloridothioate are added over an extended period of time.

The present process, which lends itself to both batch and continuous operation, is normally carried out at a temperature of from between about 50 and 90° C. and preferably at 65 to 75° C. Uniformly good results have been achieved at 70° C.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

*Example 1*

O,O-diethyl-O-(2-pyrazinyl)phosphorothioate was prepared by reacting 28.6 grams (0.242 mole) of the sodium salt of hydroxypyrazine dissolved in 250 milliliters of water with 53.5 grams (0.282 mole) of O,O-diethyl phosphorochloridothioate. The phosphorochloridothioate was added over a 5-minute period to the aqueous solution of the sodium salt of hydroxypyrazine which had been heated to 60° C.

The mixture was stirred and held at 55 to 60° C. for three hours, after which it was cooled and extracted with ether.

The ether was evaporated and the residue recovered. The yield was 39%.

In Example 1, both of the essential aspects of applicant's invention are lacking. Thus, the addition of the phosphorochloridothioate was not substantially continuous throughout the reaction period, nor was there any effort made to maintain the pH of the reaction medium. The yield is low.

*Example 2*

Employing a general procedure set forth in U.S.P. 3,004,054, 33.9 grams (0.2609 mole) of the sodium salt of hydroxypyrazine was added to 75 grams of water and 0.104 gram (0.026 mole) of sodium hydroxide followed by the addition of 48 grams (0.25 mole) of O,O-diethyl phosphorochloridothioate. The addition of the phosphorochloridothioate was carried out over a 90-minute period while maintaining the temperature of the reaction mixture at 70° C.

There was no effort to maintain the pH within the critical limits of applicant's invention.

Only a 10% excess of sodium hydroxide was present in the initial charge and this results in the pH dropping to a value below 8.5 within a 35-minute period.

This process produced a yield of 42.7% of a product containing a considerable quantity of the unreacted sodium salt of 2-hydroxypyrazine.

Employing substantially the same procedure utilizing a 100% excess of sodium hydroxide in the initial charge resulted in the pH of the reaction mixture being above 10 for a significant period of time during the reaction. As a result, the final yield of product was only 27.7%.

*Example 3*

350 grams of water and 118.1 grams of sodium pyrazinolate were charged to a reaction vessel and heated to 70° C. The pH of the solution was adjusted to 9.5 with concentrated hydrochloric acid.

A 50% sodium hydroxide solution was then charged to an addition funnel and 226.3 grams (1.2 moles) of O,O-diethyl phosphorochloridothioate was charged to a second addition funnel.

The phosphorochloridothioate is added uniformly over a 90-minute period while maintaining the temperature at 70° C. and the pH at 9 to 9.5 by the addition of the 50% sodium hydroxide solution.

At the end of the phosphorochloridothioate addition period, the reaction product was held at 70° C. and a pH of 9 to 9.5 by the addition of 50% sodium hydroxide solution for approximately 2½ hours or until the pH drop was very slow. 86 grams of 40% sodium hydroxide was required.

The mixture is then cooled to room temperature and filtered to remove a small quantity of solids, about 1 gram. The mixture is allowed to separate, the organic layer is washed with water and dried under vacuum.

183.2 grams of O,O-diethyl-O-(2-pyrazinyl)phosphorothioate was prepared in 70% real yield.

*Example 4*

Substantially the same procedure as was employed in Example 3 was employed here, except that the pH was controlled at 8 instead of 9 to 9.5.

171.2 grams of O,O-diethyl-O-(2-pyrazinyl)phosphorothioate is obtained in 61.2% real yield.

*Example 5*

Substantially the same process as was carried out in Example 3 was carried out here, except that the pH was controlled at 10.5 instead of 9 to 9.5.

86 grams of O,O-diethyl-O-(2-pyrazinyl)phosphorothioate was obtained in 28.6% real yield.

Examples 3, 4 and 5 clearly demonstrate that maintaining a pH within the critical pH range of this invention results in markedly improved yields, while the failure to so operate results in both a poor yield and poor quality of product.

What is claim is:

1. A process for preparing a pyrazinyl phosphorothioate of the formula

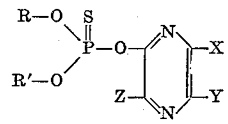

where R and R′ are lower alkyl, X, Y and Z are selected from the group consisting of hydrogen, halogen, phenyl and lower alkyl, which comprises reacting a dialkyl phosphorochloridothioate of the formula

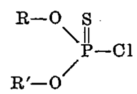

with an alkali metal salt of a hydroxypyrazine of the formula

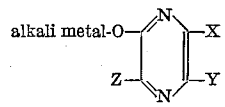

where R, R′, X, Y and Z have the values specified above, by continuously adding said dialkyl phosphorochloridothioate to an aqueous solution of said salt while maintaining the pH of the reaction mixture at between 8.5 and 10.

2. A process for preparing O,O-diethyl-O-(2-pyrazinyl) phosphorothioate which comprises reacting O,O-diethyl phosphorochloridothioate with an alkali metal salt of 2-hydroxypyrazine, by continuously adding said phosphorochloridothioate to an aqueous solution of said salt, while maintaining the pH of the reaction mixture at between 8.5 and 10 by the continuous addition to the reaction mixture of an alkali metal base.

3. A process for preparing O,O-diethyl-O-(2-pyrazinyl)phosphorothiate which comprises reacting O,O-diethyl phosphorochloridothioate with sodium 2-hydroxypyrazine by continuously adding said phosphorochloridothioate to an aqueous solution of said sodium salt while maintaining the pH of the reaction at between 9 and 9.5 by the continuous addition to the reaction mixture of sodium hydroxide.

4. A process for preparing O,O-diethyl-O-(2-pyrazinyl)phosphorothioate which consists of reacting O,O-diethyl phosphorochloridothioate with sodium 2-hydroxypyrazine by continuously adding said phosphorochloridothioate to an aqueous solution of said sodium salt while maintaining a reaction temperature of from 50 to 90° C. and a pH of between 9 and 9.5 by the continuous addition to the reaction mixture of sodium hydroxide.

References Cited

UNITED STATES PATENTS

| | | | |
|---|---|---|---|
| 2,918,468 | 12/1959 | Dixon et al. | 260—250 |
| 3,091,614 | 5/1963 | Miller et al. | 260—250 |

NICHOLAS S. RIZZO, *Primary Examiner.*